M. H. TISNE.
VALVE.
APPLICATION FILED MAR. 25, 1916.

1,289,575.

Patented Dec. 31, 1918.

WITNESSES:
René Bruine
J. J. Walcact

INVENTOR:
Marcel H. Tisne
By Attorneys,
Fraser, Turk & Myers

UNITED STATES PATENT OFFICE.

MARCEL H. TISNE, OF NEW YORK, N. Y., ASSIGNOR TO A. SCHRADER'S SON, INC., OF BROOKLYN, NEW YORK, A CORPORATION OF NEW YORK.

VALVE.

1,289,575.      Specification of Letters Patent.      Patented Dec. 31, 1918.

Application filed March 25, 1916. Serial No. 86,731.

*To all whom it may concern:*

Be it known that I, MARCEL H. TISNE, a citizen of the United States of America, residing in the borough of Manhattan, city, county, and State of New York, have invented certain new and useful Improvements in Valves, of which the following is a specification.

This invention relates to valves, and aims to provide certain improvements therein.

The invention is particularly directed to a valve which is adapted for use in connection with pneumatic mattresses or similar devices, the valve being used for inflating the mattress.

According to this invention a valve casing is provided which is preferably adapted to screw into a bushing or similar part carried by the mattress, means being provided for making a tight joint therewith. The valve casing is also provided with a screw-threaded outer end or nipple designed to make connection with an ordinary inflating pump, or with a cap for closing the end of the casing, and inwardly of said nipple is provided a shoulder for receiving the end of an ordinary rubber tube, which may be used for inflating purposes in lieu of the pump.

Referring to the drawings which illustrate one form of the invention,—

Figure 1:
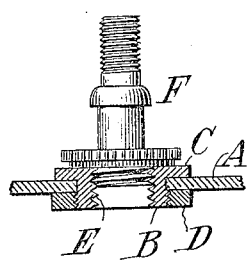
Figure 1 is an elevation of a complete valve, the bushing being shown in section.

Referring to the drawings, let A indicate the wall of a pneumatic mattress, pillow, or other similar device which it is desired to inflate. B is a bushing having a flange C adapted to fit on one side of the wall of the mattress and D is a nut which may screw on the inner side of the bushing to clamp the wall of the mattress against the flange C. Packings may be introduced between the flanges and mattress wall if desired. The bushing B has a screw-threaded aperture E which is designed to receive the valve F.

Figure 2:
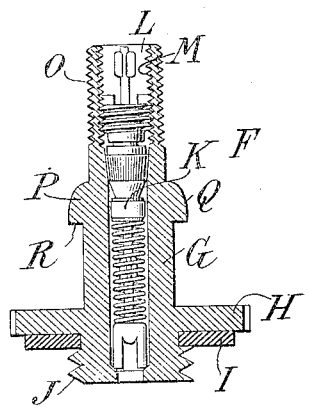
Fig. 2 is a diametrical section of Fig. 1 on a larger scale.
Figure 3:
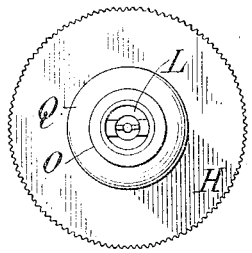
Fig. 3 is a plan view of Fig. 2.

The valve F, as best shown in Fig. 2, is constructed with a casing G, the lower part of which is provided with a flange H, preferably of considerable size, which flange performs the double purpose of acting as a backing or bearing face for the packing I, and also acting as a manipulating flange. Below the flange H is a screw-threaded part J which is adapted to screw in the bushing B until the packing I is compressed against the top of the bushing.

Any suitable form of check member or valve proper may be used, that shown being the well-known Schrader valve inside. The general form of the casing G is cylindrical, and it is provided with a bore L which leads completely through the casing, the upper part of the bore being screw-threaded, as shown at M, to receive the valve mechanism. The exterior of the valve casing at its upper end is also screw-threaded at O to receive a pump coupling, by means of which air from the pump is led to the valve; it is also adapted to receive a valve cap or other suitable closure for the end of the casing. For these purposes the outer end of the valve casing constitutes a seat against which the packing of the coupling or cap is compressed to make a tight joint.

Below the screw-threaded portion O I form a flange or shoulder P which is adapted to receive a rubber tube, the function of the flange being to stretc¹ the tube so as to make a leak-tight joint between the tube and the valve casing and also to prevent its accidental removal. For these purposes the shoulder P is preferably made with a curved or tapered face Q on its upper side and a shoulder R on its lower side, the tapered face being adapted to guide the tube over the shoulder and the shoulder R being adapted to present a more or less abrupt face to frictionally engage the tube so that it cannot be accidentally displaced. By this means the ordinary hose may be used directly on the valve or by means of a pump coupling, as may be most convenient.

While I have shown and described one form of the invention, it will be understood that I do not wish to be limited thereto, since various changes may be made therein without departing from the invention.

What I claim is:—

1. A casing for a valve or the like, having an outer end forming a seat, a screw-threaded portion adapted to receive a pump coupling and inwardly of said screw-threaded portion an external shoulder adapted to receive a tube, said shoulder being of larger diameter than the threaded portion.

2. A casing for a valve or the like, having means for engagement with a device to be inflated, a screw-threaded outer end, a seat at such end and an intermediate shoulder adapted to receive a tube, said shoulder being of larger diameter than the threaded portion.

3. A casing for a valve or the like, having means for engagement with a device to be inflated, a screw-threaded outer end, a seat at such end and an intermediate shoulder adapted to engage a tube, and said shoulder having a tapered outer face.

4. A casing for a valve or the like, having means for engagement with a device to be inflated, a screw-threaded outer end, a seat at such end, an intermediate shoulder adapted to engage a tube, and said shoulder having a tapered outer face, and an abrupt face beneath said tapered outer face.

5. A valve for mattresses or the like, comprising a casing having a lower flange, a screw-threaded portion below said flange, a packing resting against said flange on its under side, a valve mechanism within said casing, and said casing having a screw-threaded outer end, a seat at such end and a shoulder between said flange and said outer end for engaging a tube, said shoulder being of larger diameter than the threaded portion.

In witness whereof, I have hereunto signed my name in the presence of two subscribing witnesses.

MARCEL H. TISNE.

Witnesses:
   THOMAS F. WALLACE,
   GRACE GUNDERMAN.